(12) United States Patent
Namuduri et al.

(10) Patent No.: US 9,732,736 B2
(45) Date of Patent: Aug. 15, 2017

(54) SYSTEM AND METHOD FOR CONTROLLING AN ACTIVE MATERIAL ACTUATOR

(71) Applicant: GM GLOBAL TECHNOLOGY OPERATIONS LLC, Detroit, MI (US)

(72) Inventors: Chandra S. Namuduri, Troy, MI (US); Lei Hao, Troy, MI (US); Paul W. Alexander, Ypsilanti, MI (US); Xiujie Gao, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 325 days.

(21) Appl. No.: 14/226,875

(22) Filed: Mar. 27, 2014

(65) Prior Publication Data
US 2014/0306624 A1  Oct. 16, 2014

Related U.S. Application Data

(60) Provisional application No. 61/811,890, filed on Apr. 15, 2013.

(51) Int. Cl.
*H02N 2/00* (2006.01)
*F03G 7/06* (2006.01)

(52) U.S. Cl.
CPC .......... *F03G 7/065* (2013.01); *H02N 2/0075* (2013.01)

(58) Field of Classification Search
CPC .... H01L 41/12; B06B 2201/58; B06B 1/0261
USPC ......................... 318/118, 115, 127
See application file for complete search history.

(56) References Cited

U.S. PATENT DOCUMENTS

| | | | |
|---|---|---|---|
| 7,638,966 B1* | 12/2009 | Pummer | G05F 1/70 318/438 |
| 2004/0169436 A1* | 9/2004 | Fukagawa | H01L 41/042 310/317 |
| 2006/0279592 A1 | 12/2006 | Nagase | |
| 2010/0326070 A1* | 12/2010 | Hao | H01H 61/0107 60/527 |
| 2010/0332035 A1* | 12/2010 | Gao | G05B 9/02 700/275 |
| 2011/0050148 A1* | 3/2011 | Gao | H01L 41/1132 318/646 |

FOREIGN PATENT DOCUMENTS

| | | |
|---|---|---|
| CN | 101557159 A | 10/2009 |
| CN | 102084159 A | 6/2011 |
| CN | 202150024 U | 2/2012 |
| DE | 102004007391 A1 | 9/2004 |
| DE | 102006000288 A1 | 12/2006 |

(Continued)

*Primary Examiner* — Rina Duda
(74) *Attorney, Agent, or Firm* — Quinn IP Law

(57) ABSTRACT

A system for controlling an active material actuator includes an active material actuator configured to actuate when energized, a power supply configured to supply electrical power, and a control circuitry including a plurality of circuits and configured to selectively establish an electrical connection between the active material actuator and the power supply upon receipt of an activation signal. The control circuitry is configured to de-energize at least one of the circuits when no activation signal is received by the control circuitry in order to minimize parasitic current drawn from the power supply.

15 Claims, 5 Drawing Sheets

(56) References Cited

FOREIGN PATENT DOCUMENTS

| | | |
|---|---|---|
| DE | 102004009373 B4 | 5/2009 |
| DE | 102007059540 A1 | 6/2009 |
| DE | 202009007299 U1 | 8/2009 |
| JP | 2013055778 A | 3/2013 |

* cited by examiner

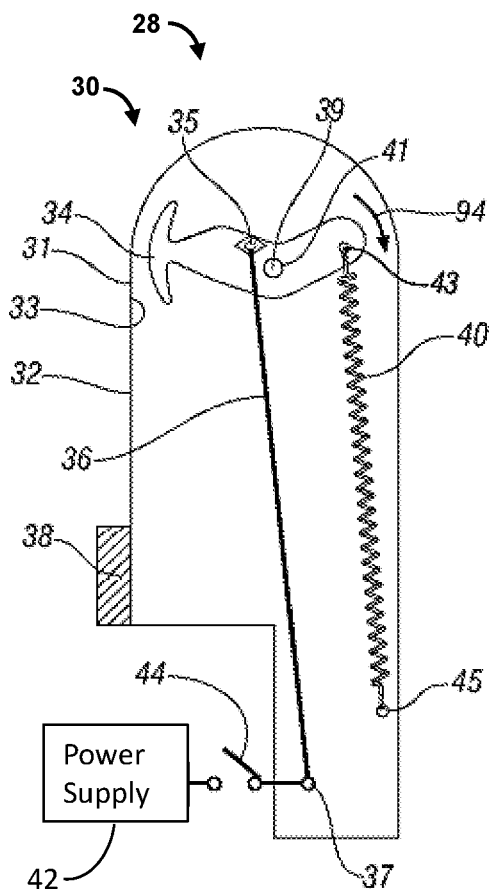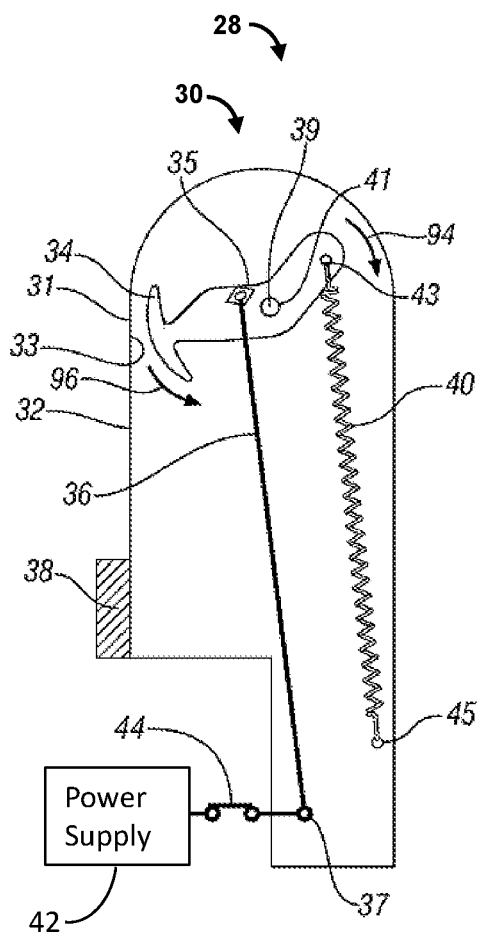
FIG. 1A
FIG. 1B

SYSTEM AND METHOD FOR CONTROLLING AN ACTIVE MATERIAL ACTUATOR

CROSS-REFERENCE TO RELATED APPLICATION

This application claims the benefit of U.S. Provisional Application No. 61/811,890, filed Apr. 15, 2013, which is hereby incorporated by reference in its entirety.

TECHNICAL FIELD

The present disclosure relates to systems and methods for controlling the actuation of an active material actuator.

BACKGROUND

Active materials provide actuation with relatively low cost and mass. Active materials may include shape memory alloys (SMAs), electroactive polymers (EAPs), piezoelectric, magnetostrictive and electrorestrictive materials. Due to the nonlinearity of active materials, it is difficult to precisely control the actuation of the active material providing the actuation.

SUMMARY

The present disclosure relates to systems for controlling an active material actuator. In an embodiment, the system includes an active material actuator configured to actuate when energized, a power supply configured to supply electrical power, and a control circuitry including a plurality of circuits and configured to selectively establish an electrical connection between the active material actuator and the power supply upon receipt of an activation signal. The control circuitry is configured to de-energize at least one of the circuits when no activation signal is received by the control circuitry in order to minimize parasitic current drawn from the power supply.

In an embodiment, control circuitry includes a voltage sensing circuit configured to measure a voltage potential of the electrical power supplied by the power supply. The voltage sensing circuit is configured to de-energize when no activation signal is received by the control circuitry. The voltage sensing circuit may include a low on-resistance solid state switch, such as a MOSFET switch, configured to selectively disconnect the voltage sensing circuit from the power supply when no activation signal is received by the control circuitry.

In an embodiment, the control circuitry includes a power supply filter electrically connected to the power supply. The power supply filter is configured to filter an output voltage supplied by the power supply. The power supply filter may include at least one diode configured to prevent reverse voltage from appearing across the circuitry following the input filter.

In an embodiment, the control circuitry includes a bias voltage regulator electrically connected to the power supply filter. The bias voltage regulator is configured to regulate the output voltage supplied by the power supply. The bias voltage regulator is configured to de-energize when no activation signal is received by the control circuitry.

In an embodiment, the control circuitry includes a power switch circuit configured to selectively establish the electrical connection between the active material actuator and the power supply when the control circuitry receives the activation signal. The power switch circuit may include a low on-resistance solid state switch, such as a MOSFET, to control an electrical current across the active material actuator.

In an embodiment, the control circuitry includes a digital control processor configured to generate a pulse width modulation signal having a duty cycle. The digital control processor is electrically connected to the power switch circuit. As such, the digital control processor is configured to transmit the pulse width modulation signal to the power switch circuit. The control circuitry further includes a computer program port electrically connected to the digital control processor. The computer program port is configured to allow transfer of data between the digital control processor and a remote computer.

In an embodiment, the control circuitry includes a temperature sensing circuit configured to measure an ambient temperature adjacent the active material actuator and generate a temperature signal indicative of the ambient temperature.

In an embodiment, the control circuitry includes a position sensing circuit configured to detect a position of the active material actuator and generate a position signal indicative of the position of the active material actuator.

In an embodiment, the control circuitry includes a current sensing circuit configured to measure an electrical current across the active material actuator and generate a current signal indicative of the electrical current through the actuator.

In an embodiment, the digital control processor is configured to receive the temperature signal, the current signal, the position signal, and the voltage signal. The digital control processor is configured to adjust the duty cycle of the pulse width modulation signal based on the current signal, voltage signal, the position signal, and temperature signal. In an embodiment, the active material actuator includes a shape memory alloy. The control circuitry may include a signal processing unit configured to filter the activation signal supplied by an external controller.

The present disclosure also relates to methods of controlling an active material actuator. In an embodiment, the method includes determining if an activation signal has been received by a control circuitry. The control circuitry may include a plurality of circuits and is configured to selectively establish an electrical connection between an active material actuator and a power supply. The method may further include de-energizing at least one of the plurality of circuits if no activation signal has been received by the control circuitry to minimize parasitic current drawn from the power supply, and energizing the plurality of circuits if the activation signal has been received by the control circuitry to establish the electrical connection between the active material actuator and the power supply in order to actuate the active material actuator.

In an embodiment, the method includes monitoring an ambient temperature adjacent the active material actuator, a position of the active material actuator, a voltage of the power supply, and an electric current across the active material actuator. The method may further include supplying a pulse width modulation signal to the active material actuator. The method may further include adjusting a duty cycle of the pulse width modulation signal based on the ambient temperature, the position of the active material actuator, the voltage of the power supply, and the electric current across the active material actuator.

The above features and advantages, and other features and advantages, of the present invention are readily apparent from the following detailed description of some of the best modes and other embodiments for carrying out the invention, as defined in the appended claims, when taken in connection with the accompanying drawings.

BRIEF DESCRIPTION OF THE DRAWINGS

FIG. 1A is a schematic view of an actuation system including an active member actuator, a power supply, and a switch in an open position;

FIG. 1B is a schematic view of the actuation system of FIG. 1A, showing the switch in a closed position;

DETAILED DESCRIPTION

Figure 2:
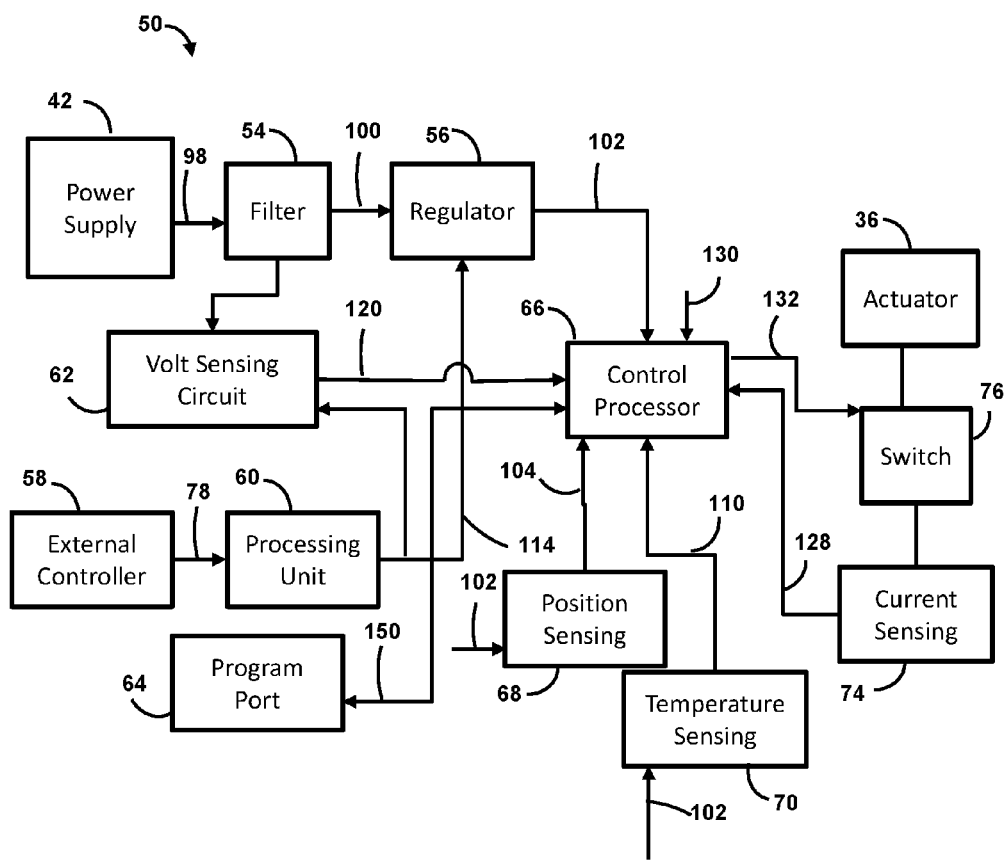
FIG. 2 is a schematic diagram of a control circuitry of the actuation system of FIG. 1A.

Referring now to the drawings, wherein the like numerals indicate corresponding parts throughout the several views, the present disclosure relates to methods and systems for controlling the actuation of an active material actuator. As used herein, the term "active material" refers to a material capable of undergoing a reversible change in its property when subjected to or occluded from an activation stimulus such as a thermal stimulus. Active materials include, but are not limited to, shape memory alloys (SMAs), electroactive polymers (EAPs), piezoelectric, magnetostrictive and electrorestrictive materials and the like. For instance, SMAs are a group of materials that demonstrate the ability to return to some previously defined shape or size when subjected to an appropriate thermal stimulus. Specifically, SMAs are capable of undergoing crystallographic phase transformations in which their yield strength, stiffness, dimension and/or shape are altered as a function of temperature. SMAs exist in several different temperature dependent-phases. For example, some SMAs exhibit large recoverable strains due to crystallographic transformations between martensite and austenite phases. Suitable SMAs include, without limitation, nickel-titanium based alloys, indium-titanium based alloys, nickel-aluminum based alloys, nickel-gallium based alloys, copper based alloys (e.g., copper-zinc alloys, copper-aluminum alloys, copper-gold alloys, and copper-tin alloys), gold-cadmium based alloys, silver-cadmium based alloys, indium-cadmium based alloys, manganese-copper based alloys, iron-platinum based alloys, iron-platinum based alloys, and the like.

FIGS. 1A and 1B schematically illustrate an actuation system including an actuation device 30. The actuation device 30 includes an active material actuator (AM) 36 configured to actuate when energized. The active material actuator 36 may be part of the actuation device 30 and is wholly or partly made of at least one active material such as an SMA. As discussed in detail below, the active material actuator 36 may change its shape or size under different temperature conditions to move another component of the actuation device 30. In addition to the active material actuator 36, the actuation device 30 includes a housing 32, a movable member 34 disposed within the housing 32, a system controller 38, and a biasing member 40 such as a spring. The movable member 34 is movably coupled to the housing 32. As such, the movable member 34 can move relative to the housing 32 between a first or unactuated position (FIG. 1A) and a second or actuated position (FIG. 1B). In the depicted embodiment, the movable member 34 is rotationally coupled to the housing 32. Consequently, the movable member 34 can rotate with respect to the housing 32 between the unactuated position and the actuated position. A pin 39 or any other suitable fastener can rotationally couple the movable member 34 to the housing 32. The pin 39 may be coupled to the inner surface 33 of the housing 32.

The actuation device 30 further includes a position sensor 41 configured to detect the position of the movable member 34. In the depicted embodiment, the position sensor 41 is a rotatory position sensor, such as a rotatory digital encoder or a potentiometer, and is coupled to the pin 39. The position sensor 41 is in electronic communication with the system controller 38 and can therefore provide a position feedback signal to the system controller 38. The position feedback signal is indicative of the position of the movable member 34 or the active material actuator 36 relative to the housing 32.

The active material actuator 36 may be a wire and includes a first actuator end 35 and a second actuator end 37. The active material actuator 36 may have a substantially U-shape and therefore the first actuator end 35 may be adjacent the second actuator end 37. It is contemplated, however, that the second actuator end 37 may be opposite to the first actuator end 35. The first actuator end 35 is mechanically coupled to the movable member 34, whereas the second actuator end 37 is mechanically coupled to the inner surface 33 of the housing 32. In one embodiment, the active material actuator 36 is wholly or partly made of a SMA. However, the active material actuator 36 may be wholly or partly made of other suitable active materials such as electroactive polymers (EAPs), piezoelectric material, magnetostrictive material, electrorestrictive materials, or a combination thereof. Although the drawings show a substantially linear wire, the active material actuator 36 may have other shapes depending on the desired function of the actuation device 30 and the actuation force required of the active material actuator 36. Regardless of its shape, the active material actuator 36 is electrically connected to a power supply (PS) 42 such as an electric storage device (ESD). A switch 44 is electrically connected between the power supply 42 and the active material actuator 36. The power supply 42 is configured to supply electrical power. The switch 44 can transition between an open state (FIG. 1A) and a closed state (FIG. 1B). In the open position, no electricity travels from the power supply 42 to the active material actuator 36. Conversely, in the closed position, electricity can travel from the power supply 42 to the active material actuator 36. Thus, the active material actuator 36 can be energized when the switch 44 is in the closed position. If the active material actuator 36 is wholly or partly made of a SMA material, the energizing current passes through the active material actuator 36 and causes a temperature change therein to induce strain in the active material actuator 36. As a result, the active material actuator 36 retracts the first actuator end 35 while the second actuator end 37 remains fixed, thus applying a torque on the movable member 34.

The biasing member 40 of the actuation device 30 may be a coil spring and is coupled between the movable member 34 and a portion of the housing 32. In the depicted embodiment, the biasing member 40 defines a first biasing end 43 and a second biasing end 45 opposite the first biasing end 43. The first biasing end 43 is mechanically coupled to the movable member 34, whereas the second biasing end 45 is mechanically coupled to the inner surface 33 of the housing 32. When the actuation device 30 is unactuated (FIG. 1A), the biasing member 40 exerts a biasing torque 94 on the movable member 34. The biasing torque 94 produces a stress imposing strain on the deactivated active material actuator 36 and thereby stretches the active material actuator 36. On the other hand, when the actuation device 30 is actuated (FIG. 1B), the active material actuator 36 is activated due to the electrical connection between the power supply 42 and the active material actuator 36. When the actuation device 30 is actuated, the energized active material actuator 36 recovers the imposed strain and exerts a corresponding force 96 on the movable member 34 that is in turn transferred to the biasing member 40 that counteracts the biasing torque 94.

The system controller 38 may be a printed circuit board (PCB) and is coupled to the housing 32. For example, in the depicted embodiment, the system controller 38 is mounted on the outside surface of the housing 33. It is envisioned, however, that the system controller 38 may be mounted on the inside surface 33 of the housing 32 or may be located outside the actuation device 30. Irrespective of its location, the system controller 38 is configured to receive an activation signal from an external controller in order to enable or disable the actuation device 30 based on certain vehicle conditions.

The system controller 38 may, for example, enable the actuation device 30 (and thus energize the active material actuator 36) upon receipt of an activation signal indicating that a vehicle hatch is open. Therefore, the actuation device 30 can be used to actively move a component of a vehicle. The movable member 34 (or another part of the actuation device 30) may be, for example, operatively coupled to a hatch vent in order to actively open or close the hatch vent based on certain vehicle conditions. As it is well known, vehicles include a vehicle body defining an interior space such as a cabin space or a trunk space. The interior space is closed by a hatch, such as a door or trunk lid. The hatch or vehicle body includes seals to tightly seal the hatch against the vehicle body to prevent debris, water, noise, among others, from entering the interior space of the vehicle around. These seals also prevent air from escaping when the hatch is closed, thereby causing an increase in air pressure within the interior space of the vehicle. The increased air pressure within the interior space resists closing of the hatch, thereby increasing the effort required to close the hatch. In order to alleviate the buildup of air pressure within the interior space of the vehicle when closing the hatch, the vehicle may include a vent assembly movable for selectively establishing fluid communication between the interior space of the vehicle and the outside environment. Thus, the vent assembly may include one or more vanes movable from a closed position to an open position to permit air to exit the interior space of the vehicle. The first actuator end 35 (or another portion of the actuation device 30) may be operatively coupled to the vanes to selectively move the vanes between the open and closed positions based on certain vehicle conditions. For instance, the vehicle may include one or more hatch sensors configured to detect whether the hatch is in an open position or a closed position. This hatch sensor may send an activation signal to the system controller 38. Accordingly, upon receipt of the activation signal indicating that the hatch is in the open position, the system controller 38 may command the actuation device 30 to move the vanes of the vent assembly to the open position. Conversely, in response to an activation signal indicating that the hatch is in the closed position, the system controller 38 may command the actuation device 30 to move the vanes of the vent assembly to the closed position. Alternatively, the system controller 38 may enable or disable the actuation device 30 to selectively move other parts of the vehicle based on other vehicle conditions.

As discussed in detail below, the system controller 38 is configured to receive power and effectively track time. In addition, the system controller 38 may monitor voltage from the power supply 42, ambient temperature adjacent the active material actuator 36, electric current across the active material actuator 36, and the position of the movable member 34 or the active material actuator 36 relative to the housing 32. Thus, the system controller 38 is configured to receive information from sensors relating to temperature, voltage, current, and activate material actuator history via discrete electrical signal lines or a local area network (LAN) bus. The LAN bus allows for structured communication signals between sensors and the system controller 38. The system controller 38 is configured to generate a voltage converted to a pulse width modulation (PWM) duty cycle across the active material actuator 36. Therefore, by controlling the PWM duty cycle across of the voltage across the active material actuator 36, the root-mean square (RMS) current of the active material actuator 36 can be effectively and precisely controlled. Alternatively, the system controller 38 may be a microcontroller unit (MCU) that is integrated into the actuation device 30 while also controlling other actuation devices.

As discussed above, the active material actuator 36 may change its shape or size upon receipt of electrical energy. For example, if the active material actuator 36 is wholly or partly made of a SMA material, the active material actuator 36 changes its shape in response to the heat generated by the electrical current flowing through it. However, because of certain conditions, the active material actuator 36 may need a variable electrical current to operate effectively. For instance, the ambient temperature, the desired position of the movable member 34, and abnormal conditions such as an open or shortened active material actuator 36 or a blocked vehicle component (e.g., blocked vent) may affect the behavior of the active material actuator 36. Accordingly, it is desirable to develop a system capable of controlling the actuation device 30 by taking into account the aforementioned conditions.

In addition, reverse voltage and overvoltage from a power supply may adversely affect the operation of the active material actuator 36. Accordingly, it is desirable to develop a system capable of protecting the active material actuator 36 against reverse voltage and overvoltage from a power supply. Moreover, an unacceptably high current may also adversely affect the operation of the active material actuator 36. Thus, it is desirable to develop a system capable of regulating the electrical current passing through the active material actuator 36 irrespective of the power supply voltage variation. It is also desirable to develop a system capable of minimizing parasitic current drawn from the power supply. As discussed above, the active material actuator 36 can be activated upon receipt of an activation signal generated by an external electronic controller. However, when the active material actuator 36 is inactive, the system may disable one or more circuits to minimize the parasitic current drawn from the power supply. Also, it is desirable to develop a programmable, low cost system capable of effectively controlling the actuation device 30 under different conditions. In some large scale applications such as automotive applications, it is important to develop a low cost system capable of effectively and efficiently controlling the actuation device 30.

Figure 3:
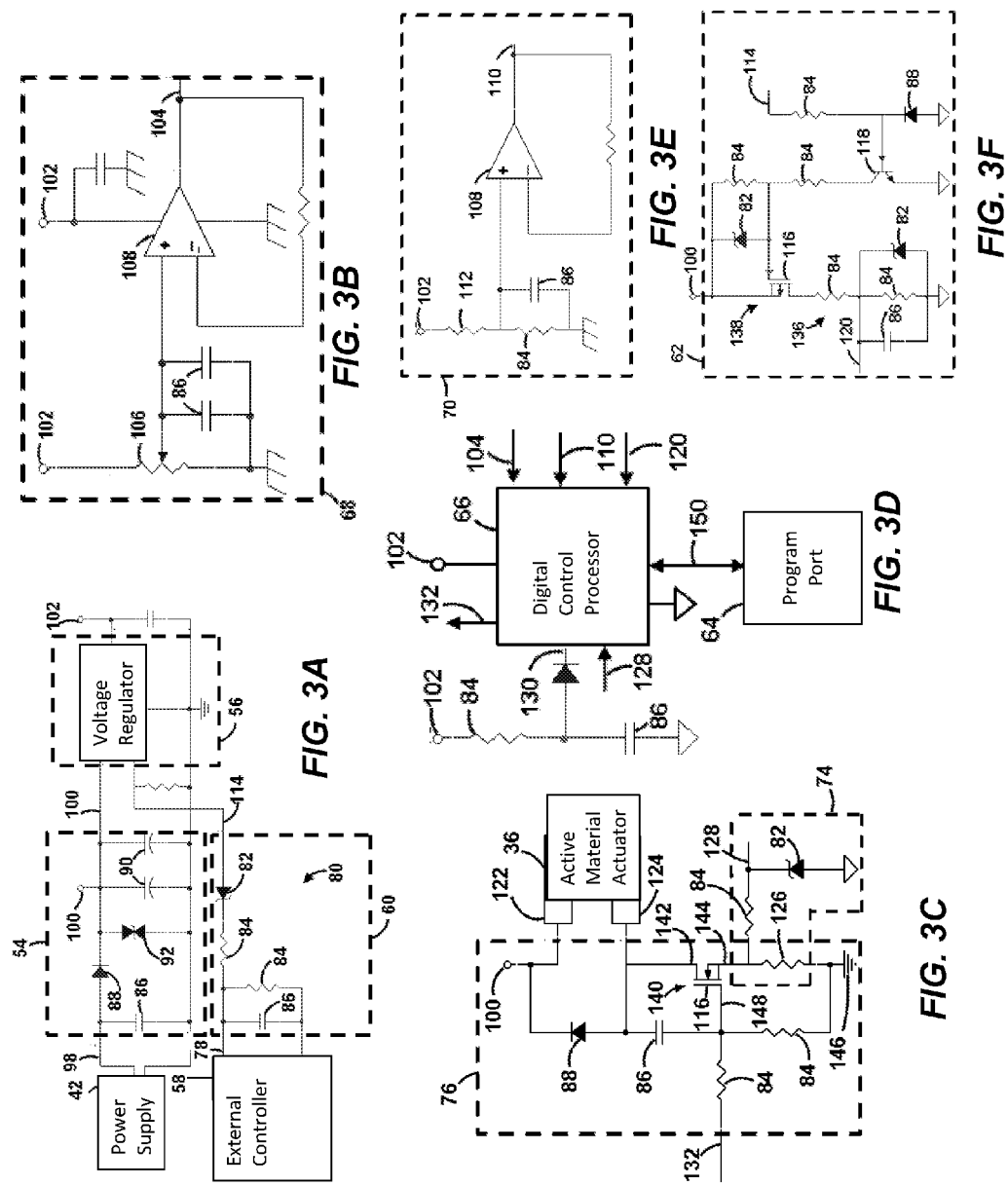
FIG. 3A is a detailed schematic partial diagram of the control circuitry illustrated in FIG. 2 in accordance with an embodiment of the present disclosure, showing a signal processing unit and a bias voltage regulator.
FIG. 3B is a schematic partial diagram of the control circuitry illustrated in FIG. 2 in accordance with an embodiment of the present disclosure, showing a position sensor circuit.
FIG. 3C is a schematic partial diagram of the control circuitry illustrated in FIG. 2 in accordance with an embodiment of the present disclosure, showing a power switch circuit, a current sensing circuit, and an active material actuator.
FIG. 3D is a schematic partial diagram of the control circuitry illustrated in FIG. 2 in accordance with an embodiment of the present disclosure, showing a digital control processor and a controller program port.
FIG. 3E is a schematic partial diagram of the control circuitry illustrated in FIG. 2 in accordance with an embodiment of the present disclosure, showing a temperature sensing circuit.
FIG. 3F is a schematic partial diagram of the control circuitry illustrated in FIG. 2 in accordance with an embodiment of the present disclosure, showing voltage sensing circuit.

FIGS. 2-3F schematically illustrate a control system for controlling the active material actuator 36. The control system includes a control circuitry 50, which is part of the system controller 38. The control circuitry includes a plurality of circuits and is in electronic communication with an external controller (EC) 58, such as a vehicle body controller. Hence, the control circuitry 50 is configured to receive an activation signal 78 from the external controller 58. The activation signal 78 may be based on certain conditions, such as vehicle conditions, in which the active material actuator 36 must be actuated to satisfy said conditions. For example, the external controller 58 may generate and send the activation signal 78 to the control circuitry 50 when a vehicle door or hatch opens or closes. The control circuitry 50 is configured to selectively establish an electrical connection between the active material actuator 36 and the power supply 42 upon receipt of the activation signal 78. Furthermore, the control circuitry 50 is configured to de-energize at least one of the circuits when no activation signal 78 is received by the control circuitry 50 in order to minimize parasitic current drawn from the power supply 42.

With continued reference to FIGS. 2-3F, the activation signal 78 is communicated to a signal processing unit (PU) 60. The signal processing unit 60 may be part of the control circuitry 50 and can process the activation signal 78 to imposed limits on the activation signal 78. For example, the signal processing unit 60 may function as a signal filter, a voltage/current limiter, or combination thereof. Therefore, the signal processing unit 60 can be configured to reduce the amplitude of signals with frequencies higher than a cut-off frequency. Alternatively or additionally, the signal processing unit 60 can be configured to impose an upper limit on the voltage/current of the activation signal 78. As shown in FIG. 3A, the signal processing unit 60 may be configured as an electrical circuit and may therefore be referred to as the signal processing circuit. In the depicted embodiment, the signal processing unit 60 includes a low pass filter circuit 80 and one or more diodes, such as Zener diodes 82, to imposed limits on the activation signal 78 to thereby generate a control signal 114. The low pass filter circuit 80 may include one or more resistors 84 and one or more capacitors such as a non-electrolytic capacitor 86. In the present disclosure, the control signal 114 may also be referred to as the filtered activation signal.

The control signal 114 can be communicated to a bias voltage regulator (VR) 56. The bias voltage regulator 56 can regulate the output voltage 98 supplied by the power supply 42 when it receives an active control signal 114. The bias voltage regulator 56 is configured to distribute an appropriate voltage through the control circuitry 50 when the power supply 42 and the external controller 58 supply voltages are active. The voltage regulator 56 is configured to turn-off the regulated voltage 102 (i.e., the bias voltage 102) when the control signal 114 is inactive to reduce parasitic current consumption of the control circuitry 50.

The power supply 42 is electrically connected to the control circuitry 50 and can therefore supply the output voltage 98 to the control circuitry 50. It is envisioned that the power supply 42 may be, for example, a battery, such as a vehicle battery, an alternator or any device capable of storing electrical energy. Accordingly, the power supply 42 may also be referred to as a vehicle power supply. The output voltage 98 is sent to a power supply filter (SF) 54. The power supply filter 54 is configured to mitigate reverse voltage. Alternatively or additionally, the power supply filter 54 is configured to suppress electromagnetic interference (EMI). In the embodiment depicted in FIG. 3A, the power supply filter 54 is configured as a power supply filter circuit and includes one or more diodes, such as a p-n or low voltage drop Schottky diode 88, configured to prevent reverse voltage. Additionally or alternatively, the power supply filter 54 may include one or more EMI transient filters configured to suppress electromagnetic interference. In the embodiment depicted in FIG. 3A, the EMI transient filters of the power supply filter 54 include one or more capacitors, such as a non-electrolytic capacitors 86 and electrolytic capacitors 90, and at least one transient-voltage suppression (TVS) diode 92. Specifically, in the depicted embodiment, the power supply filter 54 includes one non-electrolytic capacitor 86, two electrolytic capacitors 90, and one TVS diode 92 arranged in parallel. The power supply filter 54 can therefore filter the output voltage 98 supplied the power supply 42 and itself supply a protected voltage 100 to the bias voltage regulator 56.

The power supply filter 56 is electrically connected to the bias voltage regulator 56. Accordingly, the protected voltage 100 can be supplied to the bias voltage regulator 56. The bias voltage regulator 56 is configured to regulate the protected voltage 100 and supply a regulated voltage 102 throughout the control circuitry 50. As discussed above, the bias voltage regulator 56 can impose upper limits on the protected voltage 100 in order to distribute an appropriate voltage (i.e. the regulated voltage 102) through the control circuitry 50. In doing so, the bias voltage regulator 56 supplies a substantially stable voltage (i.e., the regulated voltage 102) to the circuits comprising the control circuitry 50.

With continued reference to FIGS. 2-3F, the control circuitry 50 further includes a position sensor circuit (PSC) 68 electrically connected to the bias voltage regulator 56. Hence, the regulated voltage 102 can be transmitted to the position sensor circuit 68. The position sensor circuit 68 includes the position sensor 41 (FIG. 1A) and is configured to determine the position of the active material actuator 36 and provide a position signal 104 to a digital control processor (CP) 66. The position signal 104 is indicative of the position of the active material actuator 36. The digital control processor 66 can utilize the information provided by the position signal 104 to control the active material actuator 36.

In the embodiment depicted in FIG. 3B, the position sensor circuit 68 includes a potentiometer 106 that servers as the position sensor 41. The potentiometer 106 may have a high cycle life and is supplied with regulated voltage 102 from the bias voltage regulator 56. The potentiometer 106 may be coupled to the active material actuator 36 and is thus configured to determine the position of the active material actuator 36. If the movable member 34 (or any other portion of the actuation device 30) is coupled to a hatch vent assembly, the potentiometer 106 can determine whether the hatch vent assembly is in an open position or a closed position. In addition to the potentiometer 106, the position sensing circuit 68 may include one or more filters to minimize signal noise. For example, in the depicted embodiment, the position sensing circuit 68 includes one or more capacitors, such as non-electrolytic capacitors 86, configured to function as filter to minimize signal noise. At least two non-electrolytic capacitors 86 in the position sensing circuit 68 may be arranged in parallel for achieving noise suppression over a wide frequency range. In addition to the non-electrolytic capacitors 86, the position sensing circuit 68 may include at least one buffer amplifier, such as an op-amp buffer amplifier 108, to minimize the position signal impedance. As discussed above, the position sensing circuit 68 is in electrical communication with the digital control processor 66. Accordingly, the position signal 104 can be transmitted to the digital control processor 66.

With continued reference to FIGS. 2 and 3, the control circuitry 50 further includes a temperature sensing circuit 70 configured to measure an ambient temperature adjacent the active material actuator 36 and generate a temperature signal 110 indicative of such ambient temperature. The temperature sensing circuit 70 is electrically connected to the bias voltage regulator 56 and can thus receive regulated voltage 102 from the bias voltage regulator 56. Moreover, the temperature sensing circuit 70 is also electrically connected to the digital control processor 66 and can therefore transmit the temperature signal 110 to the digital control processor 66. The digital control processor 66 can control the active material actuator 36 based on the information contained in the temperature signal 110.

As shown in FIG. 3E, the temperature sensing circuit 70 may include a temperature sensor, such as a negative temperature coefficient (NTC) thermistor 112, configured to sense the ambient temperature adjacent the active material actuator 36. The temperature sensor may alternatively be a positive temperature coefficient (PTC) thermistor. The temperature sensor (e.g. thermistor 112) may be placed close to the first actuator end 35, the second actuator end 37, or both, in order to sense the ambient temperature near the active material actuator 36 as well as any abnormal temperatures due to shortened actuator ends. The temperature sensing circuit 70 may additionally include at least one resistor 84 to enhance the temperature measurement accuracy over a predetermined temperature range. The resistor 84 is arranged in series with the thermistor 112 and its resistance value is selected so as to provide a precise temperature measurement over a predetermined temperature range (e.g., between −40 degrees Celsius and 125 degrees Celsius). Moreover, the temperature sensing circuit 70 may include one or more capacitors, such as non-electrolytic capacitors 86, configured to function as filter in order to minimize signal noise. Further, the temperature sensing circuit 70 may include at least one buffer amplifier, such as an op-amp buffer amplifier 108, to minimize the temperature signal impedance.

With continued reference to FIGS. 2-3F, the control circuitry 50 additionally includes a voltage sensing circuit (VS) 62, which is electrically connected to the power supply filter 54 and the signal processing unit 60. The voltage sensing circuit 62 can thus receive protected voltage 100 from the power supply filter 54 and the control signal 114 (i.e., filtered activation signal) from the signal processing unit 60. The voltage sensing circuit 62 is configured to monitor voltage potential in the power supply filter 54 and the signal processing unit 60 and generate a voltage signal 120. The voltage sensing circuit 62 is electrically connected to the digital control processor 66 and can transmit the voltage signal 120 to the digital control processor 66.

In the embodiment depicted in FIG. 3F, the voltage sensing circuit 62 includes a potential divider 136 formed by at least two resistors 84 arranged in series. Additionally, the voltage sensing circuit 62 includes at least one capacitor, such as a non-electrolytic capacitor 86, and one or more Zener diodes 82 to limit transient voltage spikes. Furthermore, the voltage sensing circuit 62 includes an electronic switch 138 such as a p-channel MOSFET 116 and associated gate control circuit components that are collectively configured to switch off the voltage sensing circuit 62 when the activation signal 78 is inactive in order to limit parasitic current drawn from the power supply 42. In other words, the electronic switch 138 is configured to selectively disconnect the voltage sensing circuit 62 from the power supply 42 when the control circuitry 50 has not received the activation signal 78. The gate control circuit components include resistors 84, a diode 88, Zener diodes 82, and an NPN transistor 118. The control circuitry 50 may also de-energize the bias voltage regulator 56 when it has not received the activation signal 78 to limit parasitic current drawing from the power supply 42.

With reference again to FIGS. 2-3F, the control circuitry 50 further includes a power switch circuit (PC) 76 configured to selectively disable an electrical connection between the active material actuator 36 and the power supply 42. The power switch circuit 76 is also configured to selectively establish an electrical connection between the active material actuator and the power supply 42 and is electrically connected between the active material actuator 36 and the power supply 42. For instance, the power switch circuit 76 may be electrically connected to the power supply filter 54 and may therefore be configured to receive protected voltage 100 from the power supply filter 54.

In the embodiment depicted in FIG. 3C, the power switch circuit 76 includes a low on-resistance solid state switch 140, such as a low side MOSFET 116, configured to selectively control supply of electrical current to the active material actuator 36. Moreover, the power switch circuit 76 may include a free-wheeling diode, such as a diode 88, configured to prevent voltage spikes by providing a path for the load inductive energy to be dissipated when the MOSFET 116 is switched OFF. Further, the power switch circuit 76 includes switching speed limiting components, such as a resistor 84 and a capacitor 86, to minimize electromagnetic interference generated in the power switch circuit 76.

The power switch circuit 76 is electrically connected to the digital control processor 66 and can thus receive a pulse width modulation (PMW) signal from the digital control processor 66 as discussed below. The MOSFET 116 of the power switch circuit 76 can function as a power switch and can disable or enable an electrical connection between the power supply 42 and the active material actuator 36. One side of the active material actuator 36 is electrically connected to a first terminal 122 of the power switch circuit 76, whereas another side of the active material actuator 36 is electrically connected to a second terminal 124 of the power switch circuit 76. The first terminal 122 is electrically connected to the power supply filter 54 or directly to the power supply 42. The second terminal 124 is electrically connected to the a low on-resistance solid state switch 140 (e.g., MOSFET 116) of the power switch circuit 76. Specifically, the second terminal 124 is electrically connected to the drain terminal 142 of the MOSFET 116 of the power switch circuit 76. In the power switch circuit 76, the source terminal 144 of the MOSFET 116 (or any other suitable switch return terminal) is electrically connected to the ground terminal 146 of the power supply 42. In the power switch circuit 76, the gate terminal 148 of MOSFET 116 is electrically connected to the digital control processor 66 in order to receive the PWM signal 132 from the digital control processor 66. Accordingly, the operation of the MOSFET 116 of the power switch circuit 76 is dependent on the PWM signal 132 generated by the digital control processor 66.

With reference again to FIGS. 2-3F, the control circuitry 50 further includes a current sensing circuit (CS) 74 electrically connected to the power switch circuit 76. The current sensing circuit 74 includes a shunt 126 and is configured to measure electrical current across the active material actuator 36. The electrical current may be measured across the shunt 126 to generate a signal 128 indicative of the electrical current across the active material actuator 36. The electrical current can be determined by measuring the voltage drop across the shunt 126 since the resistance of the shunt 126 is known. The current sensing circuit 74 may further include one or more diodes, such as one or more Zener diodes 82, and one or more resistors 84 to limit transient voltage spikes.

Figure 4:
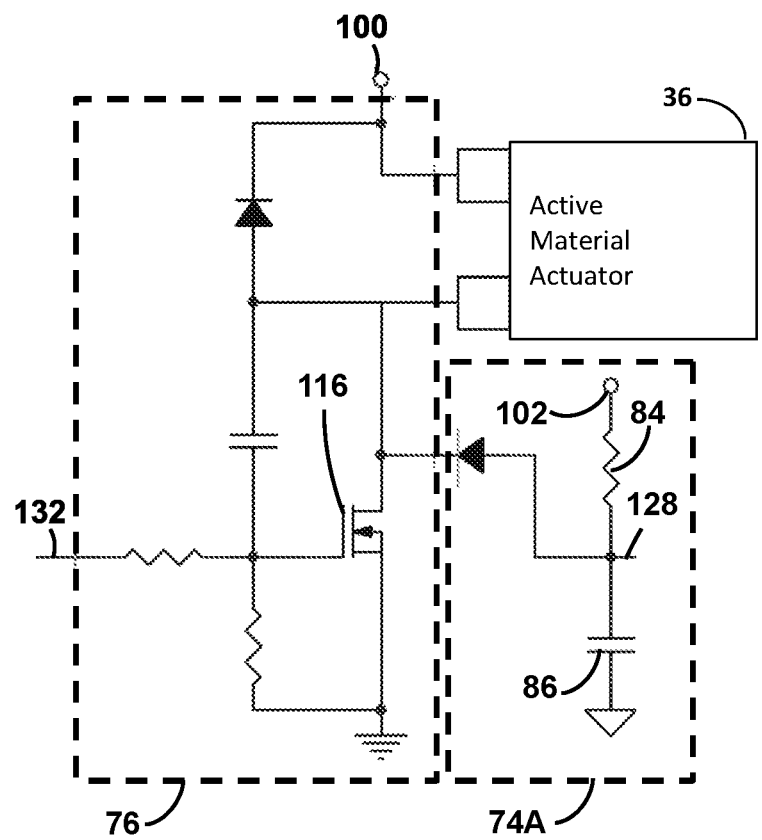
FIG. 4 is a detailed schematic diagram of a power switch circuit and a current sensing circuit of a control circuitry in accordance with another embodiment of the present disclosure.

With reference to FIG. 4, in another embodiment, the current sensing circuit 74A determines the electrical current across the MOSFET 116 of the power switch circuit 76. Actually, the voltage of the MOSFET 116 can be sensed, during the time the PMW signal 132 is active, to determine the electrical current. Specifically, current sensing circuit 74A includes a non-electrolytic capacitor 86, a resistor 84, and a diode 88 for sensing the voltage of the MOSFET 116 of the power switch circuit 76. In the depicted embodiment, the PMW signal 132 may also be referred to as the MOSFET control signal.

With reference again to FIGS. 2-3F, the control circuitry 50 includes the digital control processor 66, which is electrically connected to the current sensing circuit 74 (or 74A), the power switch circuit 76, the bias voltage regulator 56, the voltage sensing circuit 62, the temperature sensing circuit 70, and the position sensing circuit 68. Thus, the digital control processor 66 can receive several inputs, namely: the regulated voltage 102, voltage signal 120, the current signal 128, the position signal 104, and the temperature signal 110.

The digital control processor 66 may be a microprocessor, a digital signal processor, a field-programmable gate array (FPGA), a programmable logic device (PLD) or any suitable processor capable of executing computer readable instructions stored on a computer-readable storage medium. In an embodiment, the digital control processor 66 includes an on-board clock, programmable memory (e.g., erasable programmable read only memory (EPROM)) for storing computer program instructions, data memory (e.g., random-access memory (RAM)), timers, PWM signal generators for generating PWM signals, and a multi-channel analog-to-digital converter (A/D converter) for receiving analog signals and converting these signals into digital signals. In operation, the digital control processor 66 activates once the activation signal 78 is received by the control circuitry 50 and the bias voltage regulator 56 is substantially stable after a time delay set by a reset signal 130 generated by reset circuit components electrically connected between the digital control processor 66 and the bias voltage regulator 56. As seen in FIG. 3D, the reset circuit components may include one or more resistors 84, a non-electrolytic capacitor 86, and diode 88. The digital control processor 66 can utilize sensed signals (e.g., position signal 104, current signal 128, voltage signal 120, and temperature signal 110) and predetermined control parameters to generate the PWM signal 132 suitable for the operating condition of the active material actuator 36. In other words, the digital control processor 66 can execute computer instructions (e.g. a sequential logic) programmed into its memory utilizing the sensed signals and predetermined output parameters to generate the PWM signal 132. These sensed signals may be analog signals and may be transmitted to the A/D converter of the digital control processor 66. The A/D converter of the digital control processor 66 can convert these sensed analog signals into digital form. It is envisioned that, in a non-limiting embodiment, the A/D converter of the digital control processor 66 may have a minimum 10-bit resolution in order to achieve a robust control of the active material actuator 36.

In addition, the digital control processor 66 can receive data 150 including computer program instructions (i.e., a control program) from a remote computer via a controller program port (PP) 64. Thus, the system controller 38 includes the controller program port 64, which is electrically connected to the digital control processor 66. Before assembly, data 150, such as computer program instructions, can be transmitted to the digital control processor 66 via the controller program port 64. In other words, initial programming of the digital control processor 66 can be achieved by transmitting data 150 from an external computer to the digital control processor 66 via the controller program port 64. Accordingly, the data 150 (i.e., control program) stored on the external computer can be downloaded into the memory of the digital control processor 66 before the system controller 38 is assembled into the actuation device 30. Moreover, the data 150 can be transmitted from the digital control processor 66 to a remote computer via the controller program port 64 for diagnosis purposes. In operation, the digital control processor 66 utilizes the control program to detect normal or abnormal conditions of the active material actuator 36 or the control circuitry 50 and adjust or terminate the PWM signal 132 accordingly. These normal or abnormal conditions include: overcurrent through the active material actuator 36, overvoltage, undervoltage of the power supply 42, if the active material actuator 36 cannot move (i.e., stuck condition), a shortened active material actuator 36, a broken active material actuator 36, among others. If the actuation device 30 is coupled to a vent assembly, the digital control processor 66 can utilize the control program to detect if the vent is blocked based on whether the active material actuator 36 is in a "stuck condition." Moreover, the digital control processor 66 can utilize the control program to detect abnormal operations of the sensors or the active material actuator 36 and provide diagnosis feedback.

Figure 5:
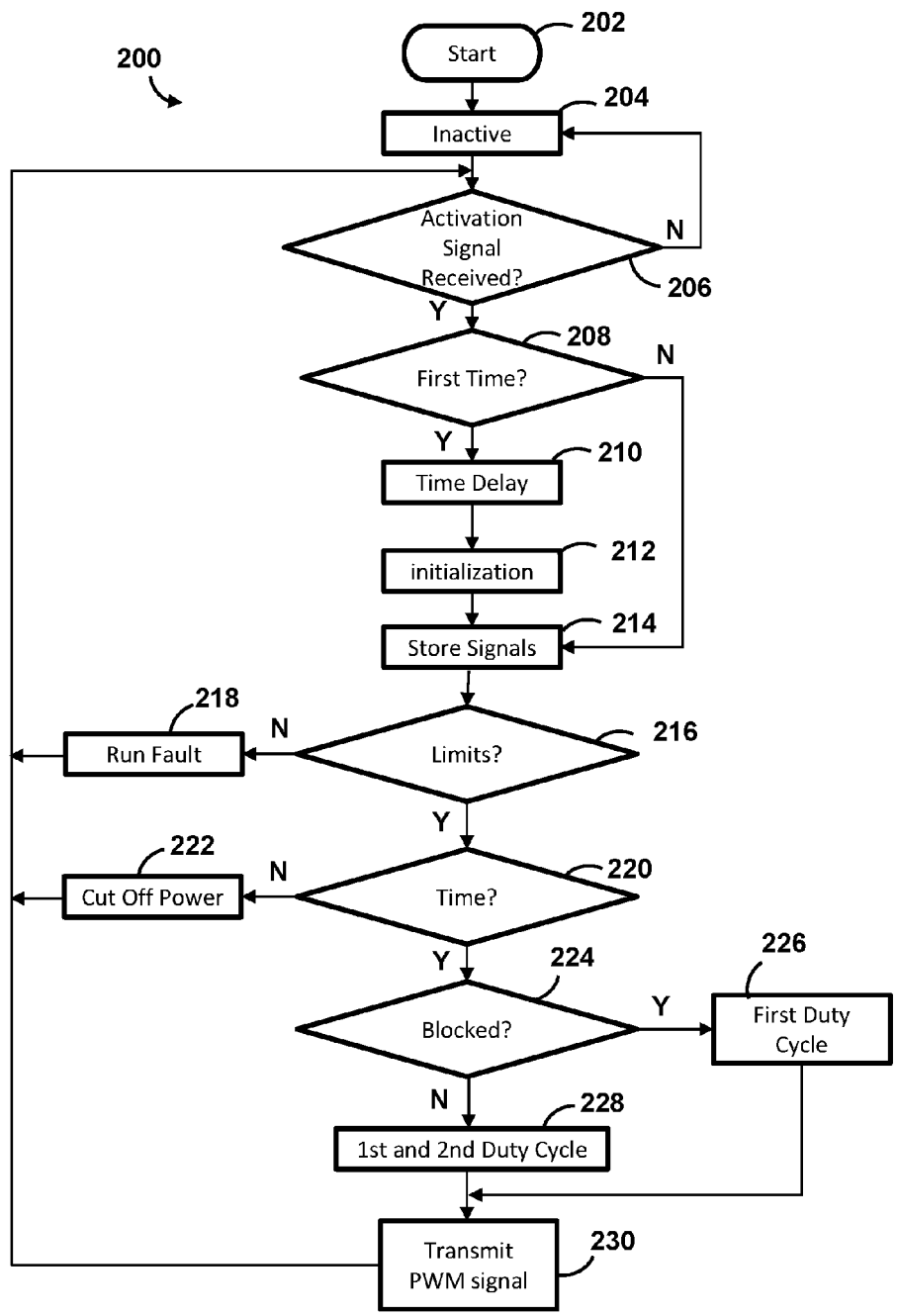
FIG. 5 is a flowchart illustrating a method of controlling the actuation device shown in FIGS. 1A and 1B.

FIG. 5 is a flowchart illustrating a method 200 of controlling the actuation of the active material actuator 36. The method 200 can be used to control the duty cycle of the PWM signal 132 transmitted to the active material actuator 36 in order to control the behavior of the active material actuator 36. For example, the digital control processor 66 can execute the method 200 to control the operation of the active material actuator 36 based on, among other things, a plurality of sensed signals (e.g., position signal 104, current signal 128, voltage signal 120, and temperature signal 110).

With continued reference to FIG. 5, the method 200 begins at block 202 (A). Then, at block 204 (B), the system controller 38 is inactive ("in sleep mode"), and electric current is not supplied to the active material actuator 36. At block 206 (C), the digital control processor 66 detects if the external controller 58, such as a vehicle body controller, has sent the activation signal 78 to the control circuitry 50. In other words, at block 206, the control circuitry 50 determines if the activation signal 78 has been received by the control circuitry 50. If no activation signal 78 has been detected, the method 200 returns to block 204 and the system controller 38 remains inactive. If the activation signal 78 has been detected, at block 206, the digital control processor 66 optionally determines if the activation signal 78 has been detected for the first time at block 208 (D). If it is the first time that the activation signal 78 has been received by the control circuitry 50, the digital control processor 66 may execute a time delay (e.g., about 2.5 seconds) to allow the control circuitry 50 to stabilize at block 210 (E). After the time delay, initialization occurs at block 212 (F). The initialization of the system controller 38 entails energizing all the circuits of the control circuitry 50, initializing the microprocessor register, and monitoring and recording an initial position of the active material actuator 36. The initial position of the active material actuator 36 may be determined using the position sensing circuit 68. Thus, the method 200 includes energizing the circuits of the control circuitry 50 if the control circuitry 50 has received the activation signal 78 from the external controller 58 in order to establish an electrical connection between the active material actuator 36 and the power supply 42, thereby actuating the active material actuator 36.

Following initialization, the system controller 38 monitors and records the position of the active material actuator 36, the ambient temperature near the active material actuator 36, the voltage of the power supply 42, and the electric current across the active material actuator 36 at block 214 (G). In particular, at block 214, several sensing circuits send sensed signals to the digital control processor 66, and the digital control processor 66 reads and stores those sensed signals. Specifically, the position sensing circuit 68 sends the position signal 104 to the digital control processor 66. The voltage sensing circuit 62 sends the voltage signal 120 to the digital control processor 66. The current sensing circuit 74 sends the current signal 128 to the digital control processor 66. The temperature sensing circuit 70 sends the temperature signal 110 to the digital control processor 66.

Returning to block 208, if the digital control processor 66 determines that it is not the first time that the activation signal 78 has been received, the system delay (i.e., block 208) and system initialization (i.e., block 212) steps are not performed, and the digital control processor 66 continues to read and record temperature, position, current, and voltage information from the sensing circuits as discussed above at block 214.

Thereafter, at block 216 (H), the digital control processor 66 determines if the sensed temperature, current, position, and voltage values are within the prescribed limits. If at least one of the sensed values is not within the prescribed limits, the digital control processor 66 performs a "run fault operation" at block 218 (J). The "run fault operation" may entail, for example, cutting off power to the system controller 38 and waiting several seconds before returning to block 206. For instance, if the ambient temperature is above a certain predetermined temperature threshold, the digital control processor 66 may command the power switch circuit 76 to cut off power to the active material actuator 36 in order to prevent the active material actuator 36 from actuating. Alternatively, the "run fault operation" may involve reducing power to the system controller 38 to a certain level.

If the digital control processor 66 determines that the voltage, temperature, position, and current values are within the prescribed limits, then the digital control processor 66 determines if the system controller 38 has been operating within a prescribed time (e.g., about 4 seconds) at block 220 (I). If the system controller 38 has been operating over the prescribed time, power is cut off to the active material actuator 36 at block 222 (K) and then the method 200 returns to block 206. Conversely, if the digital control processor 66 determines that the system controller 38 has been operating within the prescribed time, the digital control processor 66 determines if the active material actuator 36 cannot move (i.e., a stuck or blocked condition) based on the position signal 104 generated by the position sensing circuit 68 at block 224 (L).

If a blocked condition is detected, the digital control processor 66 generates a PWM signal 132 with a first duty cycle at block 226 (M). The first duty cycle of the PWM signal 132 may allow the active material actuator 36 to remain stationary most of the time while the active material actuator 36 is energized. If no blocked condition is detected, the digital control processor 66 generates a PWM signal 132 with a second duty cycle that is different than the first duty cycle. The digital control processor 66 determines the first and second duty cycle of the PWM signal 132 based on the sensed signals relating to voltage, position, current, temperature, or a combination thereof at block 228 (N).

Subsequently, the digital control processor 66 transmits the PWM signal 132 to the power switch circuit 76 with the determined output duty cycle (i.e., the first or second duty cycle) at block 230 (O). By controlling the PWM duty cycle across the active material actuator 36, the root-mean square (RMS) current of the active material actuator 36 can be controlled.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A system for controlling an active material actuator, comprising:
a power supply configured to supply electrical power;
a control circuitry including a plurality of circuits and configured to selectively establish an electrical connection between the active material actuator and the power supply upon receipt of an activation signal, the active material actuator being configured to actuate when energized; and
wherein the control circuitry is configured to de-energize at least one of the plurality of circuits when no activation signal is received by the control circuitry in order to minimize parasitic current drawn from the power supply;
wherein the plurality of circuits includes a voltage sensing circuit configured to measure a voltage potential of the electrical power supplied by the power supply, the voltage sensing circuit being configured to de-energize when no activation signal is received by the control circuitry; and wherein the voltage sensing circuit includes a low on-resistance solid state switch configured to selectively disconnect the voltage sensing circuit from the power supply when no activation signal is received by the control circuitry.

2. The system of claim 1, wherein the plurality of circuits includes a power supply filter electrically connected to the power supply, the power supply filter being configured to filter an output voltage supplied by the power supply.

3. The system of claim 2, wherein the power supply filter includes at least one diode configured to prevent reverse voltage.

4. The system of claim 2, wherein the plurality of circuits includes a bias voltage regulator electrically connected to the power supply filter, the bias voltage regulator configured to regulate the output voltage supplied by the power supply, and the power supply filter includes a diode configured to prevent reverse voltage.

5. The system of claim 4, wherein the bias voltage regulator is configured to de-energize when no activation signal is received by the control circuitry.

6. The system of claim 1, wherein the plurality of circuits includes a power switch circuit configured to selectively establish the electrical connection between the active material actuator and the power supply when the control circuitry receives the activation signal.

7. The system of claim 6, wherein the power switch circuit includes a low on-resistance solid state switch to control an electrical current across the active material actuator.

8. The system of claim 6, wherein the plurality of circuits includes a digital control processor configured to generate a pulse width modulation signal having a duty cycle, the digital control processor being electrically connected to the power switch circuit such that the digital control processor is configured to transmit the pulse width modulation signal to the power switch circuit.

9. The system of claim 8, wherein the plurality of circuits includes a temperature sensing circuit configured to measure an ambient temperature adjacent the active material actuator and generate a temperature signal indicative of the ambient temperature.

10. The system of claim 8, further comprising a computer program port electrically connected to the digital control processor, the computer program port being configured to allow transfer of data between the digital control processor and a remote computer.

11. The system of claim 1, wherein the control circuitry includes a signal processing unit configured to filter the activation signal supplied by an external controller, and the signal processing unit includes a low pass filter circuit and a Zener diode electrically connected to the low pass filter circuit to impose limits on the activation signal to thereby generate a control signal.

12. The system of claim 1, wherein the the low on-resistance solid state switch of the voltage sensing circuit is a first low on-resistance solid state switch, the plurality of circuits includes a power supply filter electrically connected to the power supply, the power supply filter is configured to filter an output voltage supplied by the power supply, the power supply filter includes a first diode configured to prevent reverse voltage, the plurality of circuits includes a bias voltage regulator electrically connected to the power supply filter, the bias voltage regulator is configured to regulate the output voltage supplied by the power supply, the bias voltage regulator is configured to de-energize when no activation signal is received by the control circuitry, the plurality of circuits includes a power switch circuit configured to selectively establish the electrical connection between the active material actuator and the power supply when the control circuitry receives the activation signal, the power switch circuit includes a second low on-resistance solid state switch to control an electrical current across the active material actuator, the plurality of circuits includes a digital control processor configured to generate a pulse width modulation signal having a duty cycle, the digital control processor is electrically connected to the power switch circuit such that the digital control processor is configured to transmit the pulse width modulation signal to the power switch circuit, the plurality of circuits includes a temperature sensing circuit configured to measure an ambient temperature adjacent the active material actuator and generate a temperature signal indicative of the ambient temperature, the plurality of circuits includes a position sensing circuit configured to detect a position of the active material actuator and generate a position signal indicative of the position of the active material actuator, and the position sensing circuit includes a first non-electrolytic capacitor, and an op-amp buffer amplifier electrically connected to the first non-electrolytic capacitor, the plurality of circuits includes a current sensing circuit configured to measure an electrical current across the active material actuator and generate a current signal indicative of the electrical current, the digital control processor is configured to receive the temperature signal, the current signal, a voltage signal, and position signal, and wherein the digital control processor is configured to adjust the duty cycle of the pulse width modulation signal based on the current signal, the voltage signal, the position signal, and the temperature signal, the system includes a computer program port electrically connected to the digital control processor, the computer program port being configured to allow transfer of data between the digital control processor and a remote computer, the control circuitry includes a signal processing unit configured to filter the activation signal supplied by an external controller, and the signal processing unit includes a low pass filter circuit and a first Zener diode electrically connected to the low pass filter circuit to impose limits on the activation signal to thereby generate a control signal, the low pass filter circuit includes a first resistor and a second non-electrolytic capacitor, the first resistor electrically connected in parallel with the second non-electrolytic capacitor, the first diode is a first p-n diode, the power supply filter includes a second non-electrolytic capacitor, a first electrolytic capacitor, a second electrolytic capacitor, and a transient voltage suppression diode electrically connected in parallel with each other, the temperature sensing circuit includes a negative temperature coefficient thermistor and a second resistor, the negative temperature coefficient thermistor is electrically connected in series with the second resistor, the voltage sensing circuit includes an NPN transistor, the power switch circuit includes a free-wheeling diode configured to prevent voltage spikes, the power switch circuit includes a third resistor electrically connected to the free-wheeling diode, and the current sensing circuit includes a second Zener diode and a fourth resistor electrically connected to the second Zener diode.

13. A system for controlling an active material actuator, comprising:
a power supply configured to supply electrical power;
a control circuitry including a plurality of circuits and configured to selectively establish an electrical connection between the active material actuator and the power supply upon receipt of an activation signal, the active material actuator being configured to actuate when energized;

wherein the control circuitry is configured to de-energize at least one of the plurality of circuits when no activation signal is received by the control circuitry in order to minimize parasitic current drawn from the power supply; and wherein the plurality of circuits includes a position sensing circuit configured to detect a position of the active material actuator and generate a position signal indicative of the position of the active material actuator, and the position sensing circuit includes non-electrolytic capacitors and an op-amp buffer amplifier electrically connected to the non-electrolytic capacitors.

14. The system of claim 13, wherein the plurality of circuits includes a current sensing circuit configured to measure an electrical current across the active material actuator and generate a current signal indicative of the electrical current.

15. The system of claim 14, wherein the plurality of circuits includes a power switch circuit configured to selectively establish the electrical connection between the active material actuator and the power supply when the control circuitry receives the activation signal, the plurality of circuits includes a digital control processor configured to generate a pulse width modulation signal having a duty cycle, the digital control processor being electrically connected to the power switch circuit such that the digital control processor is configured to transmit the pulse width modulation signal to the power switch circuit, the digital control processor is configured to receive the current signal, a voltage signal, and position signal, and wherein the digital control processor is configured to adjust the duty cycle of the pulse width modulation signal based on the current signal, the voltage signal, and the position signal.

* * * * *